United States Patent
Lukacs III et al.

[11] Patent Number: 5,558,908
[45] Date of Patent: Sep. 24, 1996

[54] PROTECTIVE COMPOSITIONS AND METHODS OF MAKING SAME

[75] Inventors: Alexander Lukacs III, Wilmington; James A. Jensen, Hockessin; Kurt J. Becker, Newark, all of Del.

[73] Assignee: Lanxide Technology Company, LP, Newark, Del.

[21] Appl. No.: 335,536

[22] Filed: Nov. 7, 1994

[51] Int. Cl.⁶ ............................................... B05D 3/02
[52] U.S. Cl. .................. 427/228; 427/377; 427/387; 427/397.7; 428/408; 437/235; 437/238; 501/88; 501/96; 501/97
[58] Field of Search .............. 106/287.11, 287.19, 106/287.23; 427/228, 377, 387, 397.7; 428/408; 501/88, 96, 97; 437/235, 238

[56] References Cited

U.S. PATENT DOCUMENTS

| | | | |
|---|---|---|---|
| 4,910,173 | 3/1990 | Niebylski | 501/97 |
| 5,179,048 | 1/1993 | Niebylski | 501/88 |
| 5,258,229 | 11/1993 | Lum et al. | 427/228 X |
| 5,436,083 | 7/1995 | Haluska et al. | 428/688 |
| 5,436,084 | 7/1995 | Haluska et al. | 427/377 X |

*Primary Examiner*—Michael Lusignan

[57] ABSTRACT

The present invention is directed to compositions derived from polymers containing metal-nitrogen bonds, which compositions exhibit, among other things, desirable oxidation resistance, corrosion resistance and hydrolytic stability when exposed to adverse environments, whether at ambient or at elevated temperatures, and which may be useful as, for example, protective coatings on surfaces.

4 Claims, No Drawings

PROTECTIVE COMPOSITIONS AND METHODS OF MAKING SAME

FIELD OF THE INVENTION

The present invention relates to novel processes for forming compositions which may be utilized, among other things, as protective coatings on surfaces. Particularly, the present invention is directed to compositions derived from polymers containing metal-nitrogen bonds, which compositions exhibit, among other things, desirable oxidation resistance, corrosion resistance and hydrolytic stability when exposed to adverse environments, whether at ambient or elevated temperatures, and which may be useful as, for example, protective coatings on surfaces.

BACKGROUND OF THE INVENTION

Significant efforts have been directed to modifying the properties of known or existing materials in a manner which renders the materials suitable for use in environments which normally would adversely affect such materials. For example, one such modifying approach generally relates to coating onto a surface of a substrate material a second material having properties which differ from the underlying substrate material.

Various methods exist for coating substrate materials. A first category of coating processes is generally referred to as overlay coatings. Overlay coatings involve, typically, a physical deposition of a coating material onto a substrate. The coating material typically enhances the performance of the substrate by, for example, increasing the erosion resistance, corrosion resistance, high temperature strength, etc., of the substrate material. These overlay coatings typically extend the life of the substrate material and/or permit the use of the substrate material in a number of environments which normally might adversely affect and/or destroy the utility of the substrate material absent the placement of the overlay coating thereon.

Commonly utilized overlay coating methods include Painting, Dipping, Spraying, Spin Coating, Chemical Vapor Deposition, Hot Spraying, Physical Vapor Deposition, etc. Such methods as Painting, Dipping, Spraying and Spin Coating are readily understood to an artisan of ordinary skill in the art as widely-applicable conventional coating techniques. Chemical Vapor Deposition utilizes a chemical process which occurs between gaseous compounds when such compounds are heated. Chemical Vapor Deposition will occur so long as the chemical reaction produces a solid material which is the product of the reaction between the gaseous compounds. The Chemical Vapor Deposition process is typically carried out in a reaction chamber into which both a reactive gas and a carrier gas are introduced. A substrate material is placed into contact with the reactant and carrier gases so that reaction between the gases and deposition of the reaction solid will occur on the surface of the substrate. Chemical Vapor Deposition processes typically involve the use of corrosive gases (e.g., chlorides, fluorides, etc.) in the reaction chamber which can be quite corrosive and must be handled carefully. Accordingly, even though Chemical Vapor Deposition processes may produce desirable coatings on some materials, the equipment that is utilized typically is complicated in design and expensive to operate.

Hot Spraying techniques also exist for the placement of an overlay coating on a substrate material. The three most widely utilized Hot Spraying techniques include Flame Spraying, Plasma Spraying, and Detonation Coating.

Flame Spraying utilizes a fine powder which is contained in a gaseous stream and which is passed through a combustion flame to render the fine powder molten. The molten powder is then caused to impinge on a surface of a substrate material which is to be coated, which material is typically cold relative to the flame spray. Bonding of the coating of flame-sprayed material to the substrate is primarily of a mechanical nature. The flame-sprayed coating is usually not fully dense and, thus, is often subsequently treated by a fusing operation to densify the coating.

Plasma Spraying is somewhat similar to Flame Spraying, except that the fine powder, instead of being passed through an intense combustion flame, is passed through an electrical plasma which is produced by a low voltage, high current electrical discharge. As a result, disassociation and ionization of gases occur which results in a high temperature plasma. The high temperature plasma is directed toward a substrate material resulting in the deposition of a layer of coating material on the substrate.

Detonation Coating is a process which has some similarities to Flame Spraying, except that a desired amount of powder is directed at high velocity (e.g., about 800 meters per second) toward the surface of a substrate material which is to be coated. While the particles are being accelerated in a hot gas stream, the particles melt. Moreover, the high kinetic energy of the particles when impinging on the surface of a substrate material results in additional heat being generated, thereby assisting the coating process.

Physical Vapor Deposition coatings include, for example, Ion Sputtering, Ion Plating, and Thermal Evaporation.

In Ion Sputtering, a vacuum chamber houses a cathode electrode such that the cathode electrode emits atoms and atomic clusters toward a substrate material to result in a sputtered film or coating being deposited on the substrate.

Ion Plating of a substrate material involves the use of a heated metal source which emits metal atoms toward a substrate material which is to be coated. Specifically, an electron beam is typically utilized to excite the metal atoms from the metal source. The excited metal atoms are then directed toward the substrate material to be coated.

Thermal Evaporation also relies on the excitation of atoms from a metal source. Specifically, in a vacuum chamber, a metal source is heated so that metal atoms evaporate from the metal source and are directed toward a substrate material to be coated. The metal atoms then collect as a coating on the substrate.

A second general category of coating formation techniques is known as conversion coating techniques. In conversion coating techniques, a substrate material, typically, is involved in a chemical reaction which modifies the composition and/or microstructure of the surface of the substrate. These conversion coating techniques also can result in desirable surface morphology modification of substrate materials. Typical examples of conversion coating techniques include Pack Cementation and Slurry Cementation. Exemplary of specific conversion coating compositions which may be applied to substrates are conversion coating techniques referred to as chromating and aluminizing, whereby a coating composition comprising such materials as chromium or aluminum is applied to a surface of a substrate and reacted with the substrate upon, for example, heating, etc.

Pack Cementation and Slurry Cementation utilize diffusion of one or more materials to form a surface coating. Specifically, in each of these processes, a substrate material is contacted with a metal source material such that a metal from the metal source material may diffuse into the substrate material and/or a component of the substrate material may diffuse toward the metal source material. Specifically, for example, in Pack Cementation, a substrate material is buried within a powder mixture which comprises, typically, both a metal which is to react with the substrate material and an inert material. A carrier gas is then induced to flow into the powder mixture so that the carrier gas can carry metal atoms from the metal powder to the surface of the substrate and deposit the metal atoms thereon. In Slurry Cementation, a composition typically is coated onto a surface of a substrate material prior to conducting the diffusion process. Both Pack Cementation and Slurry Cementation typically occur in a retort or vacuum furnace at elevated temperatures, and the carrier gas is free to transport metal atoms from the metal powder to the surface of the substrate material. Typical carrier gases include the halogen gases. Many different approaches to Pack Cementation have been made; however, most of these approaches utilize the above-discussed steps.

Conversion coatings techniques have also been carried out utilizing starting materials other than the materials discussed above with respect to Pack Cementation and Slurry Cementation. Materials such as organic resins and polymers have also been demonstrated to provide effective coatings against, for example, oxidation and corrosion under specified environmental conditions.

Protective ceramic coatings on, for example, carbon/carbon composites, graphite, carbon fibers and other oxidizable materials, formed from preceramic polymers which can be converted to ceramic upon heating have been described. U.S. Pat. No. 5,198,488 (Patent '488), in the name of Leonard M. Niebylski, is directed to the preparation of preceramic compositions which may be used to provide, among other applications, oxidation-resistant coatings on carbon/carbon composites, graphite, carbon fibers and other normally oxidizable materials by dispersing about 0.1–4 parts by weight of silicon boride in one part by weight of a polysilazane in solution in an organic solvent. The preceramic compositions are coated onto the oxidizable materials and heated to temperatures of about 675°–900° C. to pyrolyze the preceramic compositions to ceramic coatings. Patent '488 also teaches that for high temperature (i.e., higher than 800° C.) oxidation protection, the pyrolysis step is followed by thermal treatment of the coated substrate at about 1075°–1250° C. in an atmosphere containing not more than a minor amount of oxygen.

U.S. Pat. No. 5,196,059 (Patent '059), also in the name of Niebylski, is directed to preceramic compositions utilized, among other applications, to provide heat, abrasion and oxidation resistant ceramic coatings, prepared by dispersing about 0–3 parts by weight of aluminum-silicon eutectic, about 0–4 parts by weight of silicon carbide, about 1.5–5 parts by weight of silicon boride, and about 0.4–5 parts by weight of silicon metal in a solution of one part by weight of a polysilazane in an organic solvent. The formation of ceramic coatings in Patent '059 is substantially as set forth above with respect to Patent '488.

U.S. Pat. No. 5,194,338 (Patent '338), also in the name of Niebylski, is directed to preceramic compositions utilized, among other applications, to provide protective ceramic coatings on normally oxidizable materials prepared by dispersing about 0.4–3.0 parts by weight of a ceramic powder selected from silicon carbide, silicon nitride, and mixtures thereof, with one another and/or with up to about 90 percent by weight of (1) a metal boride or (2) a mixture of a metal boride and zirconium metal in one part by weight of a polysilazane. The formation of ceramic coatings in Patent '338 is substantially as set forth above with respect to Patent '488.

U.S. Pat. No. 5,258,224, in the names of Conrad J. Langlois, Jr., et al., is directed to preceramic compositions which are useful to provide protective ceramic coatings on normally oxidizable materials and which coating compositions are obtained by dispersing solid particles comprising aluminum nitride particles in an organic solvent solution of a polysilazane. Ceramic coatings derived from such dispersions may serve as intermediate strata in multilayer ceramic coatings over substrates, such as carbon/carbon substrates, to further protect such substrates, even when exposed to humidity.

The above-discussed coating compositions and techniques have been briefly addressed herein to give the reader a general understanding of the art. However, it should be understood that specific variations to the above-discussed compositions and techniques exist. Specifically, each of the coating compositions and/or processes discussed above are discussed in detail in readily available sources, including textbooks, conference proceedings, and patents. For further information relating to the detail of these processes, the reader is encouraged to consult the literature referred to above. However, even from the brief discussions above, it should be clear that each of the techniques suffers from various limitations. For example, in the overlay coating techniques, the physical deposition of a coating onto a substrate material does not insure an acceptable interface between the substrate and the coating. Specifically, because most of the overlay coating techniques simply rely on the use of a physical bonding between the coating and the substrate, the coating may not adhere adequately to the substrate. Accordingly, the purpose of the coating may be compromised completely. Additionally, the overlay coating processes typically depend on the use of somewhat complex deposition equipment. For example, Chemical Vapor Deposition requires the use of relatively complicated control means for controlling the rate of flow of reactive and carrier gases in a reaction chamber, the ability to handle corrosive gases (e.g., fluorides, chlorides), etc.

Moreover, with regard to the so-called conversion coating techniques which are formed by, for example, Pack Cementation and Slurry Cementation techniques, the coatings achieved on substrate materials may not be uniform due to the inclusion of solid materials or porosity which result from exposure of the substrate to either of or both of the powder metal source and/or inert materials utilized in the Pack Cementation or Slurry Cementation processes. Still further, many of the Pack Cementation and Slurry Cementation techniques may require the use of somewhat complex equipment.

Further, with regard to the techniques discussed in connection with the preceramic compositions of Niebylski, it is noted that these techniques include the use of specific controlled atmospheres to obtain desirable oxidation resistance at high temperatures, thus requiring the use of somewhat complex equipment. Moreover, Langlois, Jr., et al. teaches the use of specified intermediate strata compositions in multilayer ceramic coatings to enhance protection of substrates. The use of such multicompositional layers within coatings increases not only the cost of making such coatings, but also introduces the potential for incompatibility of coating layers due to, for example, coefficient of thermal expansion mismatch between layers, etc.

Accordingly, a long-felt need has existed for compositions which may be used to provide enhanced protection against, for example, oxidation, hydrolysis, etc., when applied to oxidizable substrates, without the requirement for expensive and/or complex processes.

SUMMARY OF THE INVENTION

The present invention relates to novel processes for forming compositions which may be utilized, among other things, as protective coatings on surfaces. Particularly, the present invention is directed to compositions derived from polymers containing metal-nitrogen bonds, which compositions exhibit, among other things, desirable oxidation resistance, corrosion resistance and hydrolytic stability when exposed to adverse environments, whether at ambient or elevated temperatures, and which may be useful as, for example, protective coatings on surfaces.

In a preferred embodiment of the present invention, a composition is first produced by admixing at least one boron source comprising an extended network of boron-boron bonds and at least one polymer comprising silicon-nitrogen bonds. The composition is then subjected to the introduction of energy, such as by heating, etc., in the presence of at least one oxidant. As used herein, the term "oxidant" means one or more suitable electron acceptors or electron sharers and may be an element, combination of elements, a compound, or combination of compounds including reducible compounds, and may be vapor, liquid or solid, or a combination thereof, at the process conditions. Without wishing to be bound by any particular theory or explanation, when the at least one oxidant comprises oxygen, it is believed that the oxygen from the oxidant can be chemically incorporated into the composition. In a preferred embodiment of the present invention, whereby the composition is used as a protective coating on at least a portion of at least one substrate, the at least one coated substrate is subjected to heating, either during or subsequent to said coating procedure, in the presence of at least one oxidant, such heating occurring at a sufficient temperature and for a sufficient time to permit at least some chemical reaction of the composition with at least the at least one substrate to form a chemically bonded protective coating thereon. The chemical reaction which occurs may result in a bonding zone which may be present only on a molecular level (i.e., reaction of single atoms at the substrate-coating interface) or may extend at least partially through said coating. In a particularly preferred embodiment of the present invention, the at least one coated substrate is heated in air at a temperature of at least about 250° C., and in a particularly preferred embodiment at least about 400° C., for a time sufficient to form said protective coating. In certain embodiments, mechanical bonding of the coating with at least a portion of the substrate may occur. Alternatively, some combination of chemical reaction and mechanical bonding may occur. The resulting coating comprises a highly adherent composition which exhibits, among other things, excellent resistance to oxidation and to corrosion and hydrolytic stability when exposed to such environments.

In an alternative preferred embodiment of the present invention, coatings comprising multiple layers of protective compositions may be formed to achieve a desired result. Depending on the desired application, the composition of one layer within said coating may be substantially similar to or substantially different from the composition of at least one adjacent layer. Additionally, the thickness of said coating layers may be tailored to achieve a desired result. Individual coating layer thicknesses may range significantly depending on the specific desired application; however, typical coating layer thicknesses range from about 0.001 mm to about 0.5 mm, and most preferably in the range of about 0.025 mm to about 0.1 mm. Moreover, depending on the desired application, the thickness of a given coating layer may vary in one region relative to another region.

In a further preferred embodiment of the present invention, the composition may comprise at least one filler material in at least a portion thereof. The method of the present invention is applicable to a wide variety of filler materials, and the choice of filler materials will depend on such factors as the starting materials used to form the composition, the properties sought for the final composition, the processing conditions, substrate compositions, etc.

The compositions of the present invention may be used in any number of applications including, but not limited to, coherent bodies, such as three-dimensional articles, sheets, or the like, protective coatings, adhesives, sealants, binders, as well as any other application contemplated by one skilled in the art.

DETAILED DESCRIPTION OF THE INVENTION AND PREFERRED EMBODIMENTS

The present invention relates to novel processes for forming compositions which may be utilized, among other things, as protective coatings on surfaces. Particularly, the present invention is directed to compositions derived from polymers containing metal-nitrogen bonds, which compositions exhibit, among other things, desirable oxidation resistance, corrosion resistance and hydrolytic stability when exposed to adverse environments, whether at ambient or elevated temperatures, and which may be useful as, for example, protective coatings on surfaces.

In a preferred embodiment of the present invention, a composition is first produced by admixing at least one boron source comprising an extended network of boron-boron bonds, and at least one polymer comprising silicon-nitrogen bonds. The composition is then subjected to the introduction of energy, such as by heating, etc., in the presence of at least one oxidant. As used herein, the term "oxidant" means one or more electron acceptors or electron sharers and may be an element, combination of elements, a compound, or combination of compounds including reducible compounds, and may be in vapor, liquid or solid form, or some combination thereof, at the process conditions. Without wishing to be bound by any particular theory or explanation, when the at least one oxidant comprises oxygen, it is believed that the oxygen from the oxidant can be chemically incorporated into the composition. In a preferred embodiment of the present invention, whereby the composition is used as a protective coating on at least a portion of at least one substrate, and the at least one coated substrate is subjected to heating, either during or subsequent to said coating procedure, in the presence of the at least one oxidant, such heating occurring at a sufficient temperature and for a sufficient time to permit at least some chemical reaction of the composition with the at least one substrate to form a chemically bonded protective coating thereon. The chemical reaction which occurs may result in a bonding zone which may be present only on a molecular level (i.e., reaction of single atoms at the substrate-coating interface) or may extend at least partially through said coating. In a particularly preferred embodiment of the present invention, the at least one coated substrate is heated in air at a temperature of at least about 250° C., and in a particularly preferred embodiment at least about 400° C. in air, for a time sufficient to form said protective coating. In certain embodiments, mechanical bonding of the coating with at least a portion of the substrate may occur. Alternatively, some combination of chemical reaction and mechanical bonding may occur. The resulting coating comprises a highly adherent layer which exhibits, among other things, excellent resistance to oxidation and to corrosion and hydrolytic stability when exposed to such environments.

In an alternative preferred embodiment of the present invention, coatings comprising multiple layers of protective compositions may be formed to achieve a desired result. Depending on the desired application, the composition of one layer within said coating may be substantially similar to or substantially different from the composition of at least one adjacent layer. Additionally, the thickness of said coating layers may be tailored to achieve a desired result. Individual coating layer thicknesses may range significantly, depending on the specific application; however, typical coating layer thicknesses range from about 0.001 mm to about 0.5 mm, and most preferably in the range of about 0.025 mm to about 0.1 mm. Moreover, depending on the desired application, the thickness of a given coating layer may vary in one region relative to another region.

Polymers suitable for the practice of the instant invention include polymers which comprise at least some repeating structural units which comprise at least some metal-nitrogen bonds. Suitable metal-nitrogen polymers which may be used in the method of the present invention include, but are not limited to, polymers comprising, for example, silicon-nitrogen bonds, aluminum-nitrogen bonds, boron-nitrogen bonds, and combinations thereof. Particularly preferred polymers comprising metal-nitrogen bonds for use in the present invention comprise polymers comprising at least some silicon-nitrogen bonds. For the purposes of the present invention, the term 'polymer' includes compounds having at least about 10 repeating structural units. Particularly preferred polymers for the method of the present invention comprise those polymers wherein at least about 50 percent of said repeating structural units comprise silicon-nitrogen bonds. The polymers preferably have a low vapor pressure at temperatures below about 400° C. to enable retention and reaction between at least the boron source and the underlying substrate in the presence of the at least one oxidant. Moreover, the preferred polymers of the present invention comprise fusible polymers in order to facilitate application as a coating. The polymers should preferably comprise polymers which crosslink upon the introduction of energy, such as, for example, by thermosetting upon heating. By the term 'thermoset' is meant the development of a shape-stabilized structure through the application of heat. Such a structure is typically achieved through the development of an extended network of chemical crosslinks between polymer chains. Polysilazanes, polyureasilazanes, and polythioureasilazanes are representative of such thermosettable polymers. Most preferred for the method of the present invention are polysilazane and polyureasilazane compositions which further comprise sites of organounsaturation, such as alkenyl or alkynyl groups which may be crosslinked to rigid, solid materials through thermosetting or other comparable means. Such coating compositions may optionally comprise free radical generators to assist in crosslinking.

Preferred polymers for use in the method of the present invention comprise liquid polymers which can be crosslinked using an energy input such as heat or UV irradiation. Particularly preferred polymers comprise liquid polysilazanes and polyureasilazanes which can be crosslinked to solid materials through the application of an energy input, such as those polymer compositions described in U.S. Pat. Nos. 4,929,704, 5,001,090 and 5,021,533, all in the name of Joanne M. Schwark, which patents are specifically incorporated by reference herein in their entirety. Other particularly preferred polymers include those polymer compositions described in U.S. Pat. No. 4,722,988, in the names of Porte et al., and U.S. Pat. No. 4,689,252, in the names of LeBrun et al., which patents are also specifically incorporated by reference herein in their entirety.

Solid polymers may be used in the method of the present invention by adding a solvent to the composition or by providing as a melt. Preferred solvents typically comprise organic solvents which are substantially non-reactive with the polymer. While the choice of solvents depend on the exact chemical composition of the polymers utilized, and may be readily determined by one skilled in the art, useful solvents may include, for example, hydrocarbon solvents such as hexane, heptane, toluene and xylene, ethers such as diethyl ether and tetrahydrofuran, or halogenated solvents such as chlorobenzene or tetrachloroethane. Solvents which contain oxygen may under certain conditions act as an oxidant, either alone or in combination with at least one additional oxidant, to assist in the reaction to form the protective composition. Further, solvents which contain oxygen may be reactive or non-reactive with the polymer at room temperature. Thus, alcohols, such as methanol, ethanol and isopropanol which react desirably with polysilazanes at room temperature may be used. Depending on the system chosen, in certain instances, rheology and coating capability of the composition may be affected by the solvent. In addition, oxygenated solvents which do not react or react only minimally with the polysilazane at room temperature, but which may react with the polysilazane at elevated temperatures, may be used. Such oxygenated solvents include, but are not limited to, ketones such as acetone or methyl ethyl ketone and esters such as dimethyl adipate.

Boron sources particularly suitable for use in the method of the present invention exhibit an extended network of boron-boron bonds. Thus, the number of sequential boron-to-boron bonds in the boron source should exceed one to achieve such extended network. Representative structures of boron-boron bond networks in the practice of the present invention include chain, sheet, and three dimensional cage structures. Sheet and cage structures are preferred embodiments for use in the present invention, while cage structures are particularly preferred embodiments. Examples of cage structures include, but are not limited to, crystalline polymorphs of boron and metal borides comprising the icosahedral boron structure including, for example, alpha-rhombohedral $B_{12}$, beta-rhombohedral $B_{105}$, and tetragonal $B_{50}$ structures. While not wishing to be bound by any particular theory or explanation, it is believed that an important feature in the use of the cage structures is the oxidative behavior of such structures. These boron-rich structures, particularly in the case of the icosahedral moieties, have been observed to oxidize with full retention of the icosahedral boron cage structures to form compounds which comprise suboxides of boron, rather than stoichiometric $B_2O_3$. Suboxide compounds such as, for example, $B_{12}.OBO$, are, typically, highly refractory materials with excellent properties, including excellent hardness, oxidation resistance, corrosion resistance, etc. Thus, the utilization of boron sources comprising extended boron-boron bond networks in the method of the present invention results in compositions which provide desirable protective properties at high temperatures to the substrates onto which they may be coated. In contrast, the predominant oxidation product of amorphous boron or other boron compounds which do not exhibit extended boron-boron bonding, such as $B(OH)_3$, organic or inorganic borates, boron nitride, borazines or boroxines, is amorphous or vitreous boron oxide, $B_2O_3$, which melts at about 450° C. Such boron sources are often capable of being partially oxidized to form compounds which may be useful at intermediate temperatures (e.g., temperatures at which complete conversion to $B_2O_3$ does not occur).

Boron sources suitable for the method of the present invention may comprise either fusible boron sources or infusible boron sources. Examples of fusible boron sources include, but are not limited to, boranes, carboranes and boron-containing polymers which are either liquids or meltable or solvent-soluble solids. Examples of infusible boron sources include, but are not limited to, particulate or platey inorganic boron compounds such as metal borides, etc. The boron sources preferably have low vapor pressures at temperatures at or below about 400° C. to enable retention and reaction with the silicon-nitrogen polymer, the at least one oxidant and the underlying substrate. Examples of boron sources suitable for use in this invention include, but are not limited to, boron carbide, silicon boride, including silicon hexaboride and silicon tetraboride, borides of transition metals, the lanthanide series, alkaline earth or rare earth metals, and other such borides as listed in Table I, below, derived from Table 24.3 of Structural Inorganic Chemistry (1984, Wells, A. F. Oxford Science Publications, 5th ed. p. 1053).

TABLE I

Typical Crystal Structures of Some Metal Borides

| NATURE OF B COMPLEX | STRUCTURE | EXAMPLES |
|---|---|---|
| Single chains | CrB | NbB, TaB, VB |
| | FeB | CoB, MnB, TiB, HfB |
| | MoB | WB |
| | $Ni_4B_3$ | |
| | $Ru_{11}B_8$ | |
| Double chains | $Ta_3B_4$ | $Cr_3B_4$, $Mn_3B_4$, $Nb_3B_4$ |
| Layers | $AlB_2$ | M = Ti, Zr, Nb, Ta, V, Cr, Mo, U |
| | $\epsilon$-Mo-B | $\epsilon$-W-B phase |
| 3D frameworks | $CrB_4$ | |
| | $UB_4$ | M = Y, La, Th, and the lanthanide series |
| | $CaB_6$ | M = Sr, Ba, Y, La, Th, U, and the lanthanide series |
| | $UB_{12}$ | M = Y, Zr, and the lanthanide series |

In a preferred embodiment for preparing the compositions of the present invention, from about 5 percent to about 95 percent, by weight of the total mixture of the boron source may be used. In a particularly preferred embodiment, the ratio of the boron source is about 10 percent to about 80 percent by weight of the total mixture. The polymer comprising silicon-nitrogen bonds may preferably be included in a ratio of from about 5 percent to about 95 percent by weight of the total mixture. In a particularly preferred embodiment, from about 20 percent to about 90 percent by weight of the total mixture of silicon-nitrogen polymer may be used. Moreover, the amount of silicon-nitrogen polymer utilized may be tailored to obtain a desired consistency of the composition.

In a further preferred embodiment of the present invention, the composition may comprise at least one filler material in at least a portion thereof. The method of the present invention is applicable to a wide variety of filler materials, and the choice of filler materials will depend on such factors as the starting materials used to form the composition, the properties sought for the final composition, the processing conditions, substrate compositions, etc. Fillers suitable for use in the present invention include, but are not limited to, such materials as ceramics, glasses, metals, organic and inorganic monomers, oligomers and polymers, hybrid polymers, and mixtures thereof, which fillers may or may not react with the composition. Representative ceramics include oxides, carbides, borides, nitrides and silicides, such as, for example, magnesium oxides, aluminum oxides, chromium oxides, titanium oxides, zirconium oxides, titanium nitrides, boron nitrides, silicon nitrides, silicon carbides, titanium carbides, zirconium carbides, chromium carbides, titanium borides, zirconium borides, titanium silicides and molybdenum silicides. Representative metal fillers suitable for the practice of the present invention include, but are not limited to, nickel, aluminum, zinc, chromium, steel, stainless steel, and metal alloys such as nickel-based alloys including, but not limited to, Incoloy, INCONEL® and HASTELLOY®. Organic and inorganic fillers suitable for use in the present invention may include, but are not limited to such fillers as carbon, oligomers and polymers of organic compounds such as urethanes, epoxies, imides, amides, esters, carbamates, carbonates, phenolics, silanes, siloxanes, silazanes, phosphazenes, alazanes, and borazines. In a particularly preferred embodiment, polymeric fillers may comprise fluoropolymers such as polytetrafluoroethylene, polyvinylidine fluoride, fluorinated ethylene-propylene and perfluoroalkoxy polymer. Representative hybrid polymers which may be used as fillers in the method of the present invention include those hybrid polymers comprising at least one organic electrophile and at least one metal-containing polymer, as described in U.S. patent application Ser. No. 08/148,044, filed on Nov. 5, 1994, in the names of Becker et al. and U.S. patent application Ser. No. 08/223,294, filed Apr. 5, 1994, also in the names of Becker et al., the subject matter of each of which is incorporated herein by reference in its entirety.

Fillers may be provided in a wide variety of forms and sizes, such as powders, particulates, flakes, platelets, spheres and microspheres (both hollow and solid), whiskers, bubbles, continuous fibers, yarns or tows, chopped fibers, whiskers, fiber mats, three-dimensional woven structures, or the like, and combinations thereof. Moreover, fillers may preferably be provided in an amount of from about 1 percent to about 60 percent by volume of the total composition, and most preferably between about 10 percent and about 50 percent by volume of the total mixture.

The use of filler materials of varying geometries, volume percentages and compositions in the method of the present invention, along with the capability to tailor the composition itself, permits the capability to tailor the properties of compositions produced by the method of the present invention to achieve a virtually unlimited number of possible combinations of properties. For example, in a preferred embodiment of the present invention for forming a protective coating on a substrate, the composition may be tailored to include at least one filler which is chosen such that it provides a coating having a linear thermal expansion coefficient close to that of the substrate being coated. Coefficient of thermal expansion matching provides for the retention of coating integrity during thermal cycling and prevents coating spalling due to stresses imposed during cool-down. Moreover, in another preferred embodiment of the present invention, when at least one filler comprising flakes such as, for example, stainless steel leafing grade flakes is incorporated into the composition to be coated onto a substrate as a protective layer, a seal of overlapping stainless steel flakes is achieved, providing, among other things, enhanced oxidation and corrosion resistance. Moreover, although not wishing to be bound by any particular theory or explanation, it is believed that the overlapping nature of the filler material in the form of flakes provides additional protection upon exposure to an undesirable environment by providing, for example, a more tortuous path through which any undesirable environment which is able to penetrate the coating composition must traverse before reaching the substrate. In an alternative preferred embodiment, the addition of ceramic filler compositions such as, for example, silicon carbide filler to the composition may increase, among other things, the abrasion resistance of the substrate surface.

The sizes and geometries of the components utilized to form the compositions of the present invention may vary significantly depending on the desired final composition. In a particularly preferred embodiment of the present invention, particle size of any particulates which may be present in the mixture (e.g., boron source, filler, etc. ) should be between about 0.1 µm and 100 µm, and most preferably between about 0.1 µm and 10 µm. Moreover, as discussed earlier herein, the compositions of the present invention may be either homogeneous or heterogeneous depending on the desired final properties, etc., of the compositions. When a homogeneous composition is preferred for a given composition, the composition may be processed in a manner sufficient to ensure such a homogeneous mixture using any technique, such as by milling, etc., which would be readily apparent to one skilled in the art.

The compositions of the present invention may be used in any number of applications including, but not limited to, coherent bodies, such as three-dimensional articles, sheets, or the like, protective coatings, adhesives, sealants, binders, as well as any other application contemplated by one skilled in the art.

In a particularly preferred embodiment of the present invention, the compositions of the present invention may be utilized as protective coatings on a variety of substrate materials. Substrates suitable for coating by the method of the present invention include, but are not limited to, metals, metal alloys, metal matrix composites, intermetallics, minerals, carbon, organic and inorganic oligomers and polymers, hybrid polymers, glasses, ceramics, ceramic composites, and the like. The geometries of the substrates which may be coated utilizing the compositions of the present invention may include, but are not limited to, coherent bodies, powders, particulates, continuous fibers, yarns or tows, chopped fibers, whiskers, fiber mats, three-dimensional woven structures, or the like. In a particularly preferred embodiment of the present invention, the substrates may comprise at least partially oxidizable substrates, and most particularly substrates which can incorporate oxygen to form stable, non-volatile oxides. Representative of the oxidizable substrates which are particularly useful in the practice of the present invention are ferrous metals such as cast iron, mild steel, and stainless steel, as well as non-ferrous metals such as aluminum and aluminum-silicon alloys. Also suitable are compounds which can oxidize to form metal-oxide comprising compositions including, but not limited to metal borides, metal nitrides, metal carbides, metal sulfides, and metal phosphides, including but not limited to substrates such as silicon carbide, silicon nitride, titanium nitride, aluminum nitride, and titanium diboride.

The compositions of the present invention are suitable for coating onto surfaces of substrates without the requirement for any special substrate surface preparation. In a particularly preferred embodiment, it was unexpectedly observed that for some oxidizable metals, such as ferrous metals, treatment of the substrate surface, such as cleaning or oxidation of the surface, is typically not required in the process of the present invention. Without wishing to be bound by any particular theory or explanation, it is believed that such surface treatment is not required due to the presence of oxygen-containing groups, such as hydroxyl groups or the like, on at least a portion of the native substrate surfaces which enhance formation of the coatings; this feature of the present invention is particularly useful when coating surfaces containing at least some rust, or the like. This novel feature is particularly unexpected in view of the teachings of prior art coating techniques where surface preparation can be crucial to coating adhesion. However, if desired in a given embodiment, the substrate surfaces may be modified to enhance coating by any of a number of techniques. Physical means, such as sandblasting and grit blasting, or chemical oxidation, which can be accomplished by etching the surface with an inorganic acid such as phosphoric acid or chromic acid and/or anodizing, are suitable methods for modifying the substrate surfaces, the selection of which may depend on the particular substrate. Alternatively, air oxidation may be used to prepare the substrate for coating.

Applying the protective composition to at least a portion of at least one substrate surface may be accomplished by any number of conventional methods. Examples of preferred techniques include, but are not limited to, brush-coating, spray-coating, dip-coating, and the like. For example, in a preferred embodiment, coating compositions which comprise a meltable polymer may be applied by dipping the substrate into a melt. Moreover, fluid compositions comprising either a solvent or a liquid metal-nitrogen polymer may be applied, for example, by brush, dip, or spray coating techniques. In another embodiment of the present invention, when heat-curable liquid coating compositions are utilized, the coating may be applied by hot-spraying, i.e., spraying the coating onto a substrate which has been heated to a temperature above ambient temperature. In a particularly preferred embodiment, the substrates may be heated, preferably to at least about 100° C., prior to coating. Upon contact with the heated substrate, the coating composition cures on the surface, obviating additional processing steps and creating a simple, economical method of forming multiple coating layers in a continuous application process. Multiple coatings may be applied where it is desirable to use coatings to provide separate protection-specific properties. For example, in a particularly preferred embodiment. Multiple coatings on mild steel may be applied whereby zirconium oxide is added as a filler to the protective composition of the top layer to provide resistance to, for example, acidic environments, and stainless steel flake may be added to the coating composition of the bottom layer to provide resistance to, for example, abrasion.

In a particularly preferred embodiment of the present invention wherein the compositions are utilized as protective coatings, such coatings may be formed by heating the mixture comprising the at least one polymer comprising silicon-nitrogen bonds and the at least one boron source under appropriate processing conditions. In a particularly preferred embodiment of the present invention, the coating may be formed by heating the mixture of the at least one polymer containing silicon-nitrogen bonds and the at least one boron source in the presence of at least one oxidant. Temperatures greater than 250° C. are preferred, with temperatures greater than 400° C. being particularly preferred, depending on the substrates utilized. For particularly durable substrates, such as refractory metals, ceramics and stainless steel, temperatures as high as 1000° C. or higher may be used.

The nature of the protective coating depends on the temperature to which the coating is heated. In low temperature ranges, for example less than about 500° C., the nature of the coating comprises predominantly that of a highly crosslinked polymer. At higher temperatures, for example about 500° C. to 1000° C., the coating takes on predominantly amorphous characteristics. At the highest temperature ranges, for example temperatures greater than about 1000° C., predominantly amorphous or crystalline ceramic characteristics may be obtained.

Oxidants which are preferred in the method of the present invention include, but are not limited to, oxygen, air, mixtures of oxygen with inert or other oxidizing gases, and the like. Particularly preferred oxidants in the present invention comprise air, oxygen and other oxidizing atmospheres which further comprise water vapor, such as water vapor-saturated air. Without wishing to be bound by any particular theory or explanation, it is believed that the water vapor may aid in the oxidation of the coating composition by providing partial hydrolysis of the silicon-nitrogen bonds in the at least one polymer. In addition, when at least one filler is incorporated into the compositions, the water vapor may also at least partially oxidize the at least one filler.

Various demonstrations of the present invention are included in the Examples immediately following. However, these Examples should be considered as illustrative only and not be construed as limiting the scope of the invention as defined in the appended claims. Additionally, a number of Comparative Examples are provided.

EXAMPLE 1

The present Example demonstrates, among other things, the preparation of a polysilazane: $[(CH_3SiHNH)_{0.8}(CH_2=CHSiCH_3NH)_{0.2}]_x$ which can be used to form a coating on a substrate. An about 5 liter, three-necked flask was equipped with an overhead mechanical stirrer, a dry ice/acetone condenser (about −78° C.), an ammonia or nitrogen inlet tube and a thermometer to form an apparatus. The interior of the apparatus was sparged with nitrogen. The apparatus was then charged with hexane (about 1760 milliliters (ml), dried over Type 4A molecular sieves), methyldichlorosilane (about 209 ml, about 230.9 grams, about 2.0 mol) and vinylmethyldichlorosilane (about 64 ml, about 69.6 grams, about 0.5 mol). Ammonia was added to the apparatus at a rate of about 3.5 liters per minute (about 9.37 mol) for about one hour. During the ammonia addition, the temperature of the contents of the apparatus rose from about 25° C. to about 69° C. After about one hour, the ammonia flow was stopped and the reaction mixture was allowed to cool to about room temperature. The reaction mixture was filtered on a glass-fritted funnel to remove any precipitated ammonium chloride. The hexane was removed from the filtrate under reduced pressure of about 2 millimeter (mm) mercury (Hg) (0.079 inch Hg) to give a polysilazane $[(CH_3SiHNH)_{0.8}(CH_2=CHSiCH_3NH)_{0.2}]_x$, as a clear oil (about 150.8 gram, about 2.34 mol, about 94 percent yield) having a viscosity of about 43 cemipoise at about 25° C., and a molecular weight of about 560 grams/mol.

EXAMPLE 2

The present Example demonstrates, among other things, the preparation of a polyureasilazane which can be used to form a protective coating on a substrate. A methylvinylpolyureasilazane was prepared substantially by the method of U.S. Pat. No. 4,929,704. Specifically, an about 100 milliliter (ml) one-necked flask equipped with a stir bar and a septum was sparged with nitrogen and charged with about 10.0 grams of the polysilazane, $[(CH_3SiHNH)_{0.8}(CH_2=CHSiCH_3NH)_{0.2}]_x$, prepared substantially as described in Example 1 and about 0.2 weight percent phenyl isocyanate. The flask was placed in an oil bath on a stirrer/hot plate and the septum was replaced with a water condenser capped with a septum. A nitrogen inlet and oil bubbler outlet were placed in the septum. The reaction mixture was then heated to about 110° C. under a nitrogen atmosphere for about 17 hours. Evolution of hydrogen gas was observed. After cooling to about room temperature, the viscosity of the liquid polyureasilazane product measured about 300 centipoise.

EXAMPLE 3

The present example demonstrates, among other things, the formation of a coating composition from a mixture comprising a polyureasilazane, boron carbide and zinc. A stainless steel substrate (Series 304) measuring about 8 cm by 8 cm by 0.1 cm was prepared for coating by sandblasting the surface. The substrate was then coated by brush coating a mixture onto the substrate. The coating mixture comprised about 50 percent by weight of zinc dust (~66 μm, L2-1144, #136, leafing grade, Canbro, Quebec, Canada), about 25 percent by weight boron carbide ($B_4C$, 5 μm, ESK-Engineered Ceramics, New Canaan, Conn.), and 25 percent by weight polyureasilazane prepared substantially according to the method of Example 2 (and with the addition of about 0.5 percent dicumyl peroxide by weight of the polyureasilazane). The coated substrate was heated to about 150° C. in air for about 30 minutes, then heated to about 500° C. in air for about 3 hours. The coated substrate remained unaffected by corrosion when exposed to a saturated aqueous sodium chloride solution for about 24 hours at ambient temperature.

EXAMPLE 4

The present example demonstrates, among other things, the formation of a coating composition from a mixture comprising a polyureasilazane, boron carbide and silicon carbide. Example 3 was substantially repeated except that the coating mixture was comprised of about 50 percent by weight of polyureasilazane prepared substantially according to the method of Example 2 (and with the addition of about 0.5 percent dicumyl peroxide by weight of the polyureasilazane), about 25 percent by weight of boron carbide ($B_4C$, 5 μm, ESK-Engineered Ceramics, New Canaan, Conn.), and about 25 percent by weight silicon carbide (E-110, 5 μm Norton, Liliesand, Norway). The coated substrate was heated to about 150° C. in air, then heated to about 600° C. in air. The coated substrate remained unaffected by corrosion when exposed to a saturated aqueous sodium chloride solution at ambient temperature for about 24 hours.

EXAMPLE 5

The present example demonstrates, among other things, the formation of a coating composition from a mixture comprising a polyureasilazane, boron carbide and zirconium oxide. Example 3 was substantially repeated except that the coating mixture was comprised of about 25 percent by weight of polyureasilazane prepared substantially according to the method of Example 2 (and with the addition of 0.5 percent dicumyl peroxide by weight of the polyureasilazane), about 15 percent by weight of boron carbide ($B_4C$, 5 μm, ESK-Engineered Ceramics, New Canaan, Conn.), and about 60 percent by weight zirconium oxide (0.5 μm, SC-15 grade, Magnesium Elektron, Inc., Flemington, N.J.). The coated substrate was heated to about 150° C. in air for about 30 minutes, then heated to about 800° C. in air for about 3 hours. The coated substrate remained unaffected by corrosion when exposed to a saturated aqueous sodium chloride solution at ambient temperature for about 1 week.

EXAMPLE 6

The present example demonstrates, among other things, the formation of a coating composition from a mixture comprising a polyureasilazane, boron carbide and silicon carbide. Example 3 was substantially repeated except that the coating mixture comprised about 30 percent by weight of polyureasilazane prepared substantially according to the method of Example 2 (and with the addition of about 0.5 percent dicumyl peroxide by weight of the polyureasilazane and about 5 percent toluene), about 10 percent by weight of boron carbide ($B_4C$, 5 μm, ESK-Engineered Ceramics, New Canaan, Conn.), and about 60 percent by weight silicon carbide (E-110, 5 μm, Norton, Liliesand, Norway). The coated substrate was heated to about 150° C. in air for about 30 minutes, and then heated to about 600° C. in air for about 3 hours. The coated substrate demonstrated resistance to corrosion when exposed to concentrated sulfuric acid at ambient temperature for about 6 hours.

EXAMPLE 7

The present example demonstrates, among other things, the formation of a coating composition from a mixture comprising a polyureasilazane, boron carbide and silicon carbide. Example 6 was essentially repeated except that the formed coating was exposed to saturated aqueous sodium chloride solution at ambient temperature for about 1 day and demonstrated resistance to corrosion.

EXAMPLE 8

The present example demonstrates, among other things, the formation of a coating composition from a mixture comprising a polyureasilazane, boron carbide and silicon carbide. Example 3 was substantially repeated except that the coating mixture was comprised of about 40 percent by weight of polyureasilazane prepared substantially according to the method of Example 2 (and with the addition of about 0.5 percent dicumyl peroxide by weight of the polyureasilazane and about 5 percent toluene), about 20 percent by weight of boron carbide ($B_4C$, 5 μm, ESK-Engineered Ceramics, New Canaan, Conn.), and about 40 percent by weight silicon carbide (E-110, 5 μm, Norton, Liliesand, Norway). The coated substrate was heated to about 150° C. in air for about 30 minutes, and heated to about 600° C. in air for about 3 hours. The coated substrate demonstrated resistance to corrosion when exposed to concentrated sulfuric acid at ambient temperature for about 2 days.

EXAMPLE 9

The present example demonstrates, among other things, the formation of a coating composition from a mixture comprising a polyureasilazane, boron carbide and silicon carbide. Example 6 was essentially repeated except that the formed coating was exposed to concentrated hydrochloric acid at ambient temperature for about 2 days and demonstrated resistance to corrosion.

EXAMPLE 10

The present example demonstrates, among other things, the formation of a coating composition from a mixture comprising a polyureasilazane, boron carbide and zirconium oxide. A stainless steel substrate (series 310) measuring about 8 cm by 8 cm by 0.1 cm was prepared for coating by sandblasting the surface. The substrate was then coated by spraying a mixture comprising about 25 percent by weight polyureasilazane prepared substantially according to the method of Example 2, about 60 percent by weight zirconium oxide (0.5 μm, SC-15 grade, Magnesium Elektron, Inc., Flemington, N.J.), and about 15 percent by weight boron carbide (5 μm $B_4C$, ESK-Engineered Ceramics, New Canaan, Conn.)) which had been milled for about 12 hours. A coating of about 50 to 60 μm thickness was applied to the substrate surface using a Paasche Model H airbrush with a dual action external mix and a #3 needle with a #5 cone. The coated substrate was heated in air at about 150° C. for about 15 minutes, and then was heated to about 200° C. in air. The temperature was increased to about 500° C. at a rate of about 100° C. per hour and held at about 500° C. for about 1 hour, after which time the temperature was increased to about 800° C. at about 200° C. per hour and held at about 800° C. for about 1 hour. The coated substrate was then cooled to room temperature.

EXAMPLE 11

The present example demonstrates, among other things, the formation of a coating composition from a mixture comprising a polyureasilazane, boron carbide and stainless steel filler. Example 10 was essentially repeated, except that the liquid mixture was prepared by combining about 175 grams of polyureasilazane prepared substantially according to the method of Example 2, about 32 grams of boron carbide (5 μm, $B_4C$ from ESK-Engineered Ceramics, New Canaan, Conn.), and about 60 grams 316 stainless steel flakes (15–40 μm, 316×55 leafing grade, U.S. Bronze Powders, Inc., Flemington, N.J.), and milling for about 1 hour. The coating was tested by heating to about 850° C. for about 24 hours in an oxidizing atmosphere, and was observed to remain adherent and unaffected by oxidation.

EXAMPLE 12

The present example demonstrates, among other things, the formation of a coating composition from a mixture comprising a polyureasilazane, silicon boride and silicon carbide. Example 10 was substantially repeated except that the coating mixture comprised about 50 grams of polyureasilazane prepared substantially according to the method of Example 2, about 10 grams of silicon tetraboride (~66 μm, Cerac/Pure Advanced Specialty Inorganics, Milwaukee, Wis.), and about 10 grams of silicon carbide (E-110, 5 μm, Norton, Liliesand, Norway). The coated substrate was heated to about 200° C. for about 30 minutes in air, then heated to about 500° C. for about 1 hour in air, and then heated to about 800° C. for about 30 minutes in air. After quenching in air at room temperature, the coating was immersed in water for about 72 hours, and was subjected to a scratch test to determine hydrolytic stability and adherence, respectively. It was observed that the coating remained adherent and unaffected by oxidation and hydrolysis.

EXAMPLE 13

The present example demonstrates, among other things, the formation of a coating composition from a mixture comprising a polyureasilazane, nickel and boron carbide. Example 10 was essentially repeated except that the coating mixture comprised about 80 grams of polyureasilazane prepared substantially according to Example 2, about 40 grams of nickel leaf powder (15–40 μm, fine leafing grade flake, Novamet, Wycoff, N.J.), and about 12 grams of boron carbide ($B_4C$, 5 μm, ESK-Engineered Ceramics, New Canaan, Conn.). The coating remained adherent and unaffected by oxidation when heated to about 850° C. for about 24 hours.

EXAMPLE 14

The present example demonstrates, among other things, the formation of a coating composition from a mixture comprising a polyureasilazane, silicon boride and silicon carbide. Example 10 was substantially repeated, except that the coating mixture comprised about 50 grams of polyureasilazane prepared substantially according to Example 2, about 10 grams of silicon hexaboride (~66 μm, Cerac/Pure Advanced Specialty Inorganics, Milwaukee, Wis.), and about 10 grams of silicon carbide (E-110, 5 μm, Norton, Liliesand, Norway). The coated substrate was heated to about 200° C. for about 30 minutes in air, then heated to about 500° C. in air for about 1 hour, and then heated to about 800° C. in air for about 30 minutes. The coating remained adherent and unaffected by hydrolysis after it was immersed in water for about 72 hours and then subjected to a scratch test.

EXAMPLE 15

The present example demonstrates, among other things, the formation of a coating composition from a mixture comprising a polyureasilazane, lanthanum boride and silicon carbide. Example 10 was substantially repeated except that the coating mixture was comprised of about 75 grams polyureasilazane prepared substantially according to Example 2, about 15 grams of lanthanum hexaboride (40 μm, Cerac/Pure Advanced Specialty Inorganics, Milwaukee, Wis.), and about 15 grams of silicon carbide (E-110, 5 μm, Norton, Liliesand, Norway). The coated substrate was heated to about 200° C. in air for about 30 minutes, then heated to about 500° C. in air for about 1 hour and then heated to about 800° C. for about 30 minutes. The coating remained adherent and unaffected by hydrolysis after it was immersed in water for about 72 hours and then subjected to a scratch test.

EXAMPLE 16

The present example demonstrates, among other things, the formation of a coating composition from a mixture comprising a polyureasilazane, aluminum boride and silicon carbide. Example 10 was substantially repeated except that the mixture was prepared by combining about 50 grams of polyureasilazane prepared substantially according to the method of Example 2, about 10 grams of aluminum boride ($AlB_{12}$, 3–8 μm m, Alfa Products, Danvers, Mass.), and about 10 grams of silicon carbide (E-110, 5 μm, Norton, Liliesand, Norway). The coating was brushed onto the surface and the coated substrate was heated to about 500° C. for about 1 hour in air, and then was heated to about 800° C. for about 30 minutes in air. The coated substrate was unaffected by water after about 72 hours of immersion.

EXAMPLE 17

The present example demonstrates, among other things, the formation of a coating composition from a mixture comprising a polyureasilazane, barium boride and silicon carbide. Example 10 was substantially repeated except that the mixture was prepared by combining about 50 grams of polyureasilazane prepared substantially according to the method of Example 2, about 10 grams of barium hexaboride (40 μm, $BaB_6$, Alfa Products, Danvers, Mass.), and about 10 grams of silicon carbide (E-110, 5 μm, Norton, Liliesand, Norway). The coating was brushed onto the surface and the coated substrate was heated to about 500° C. for about 1 hour in air, and then was heated to about 800° C. for about 30 minutes in air. The coated substrate was unaffected by water after about 72 hours of immersion.

EXAMPLE 18

The following example demonstrates, among other things, the formation of a coating composition from a mixture comprising silicon boride and polyureasilazane. A cylindrical graphite disc measuring about 5 cm in diameter by about 0.6 cm in height and weighing about 22.01 grams was brush coated with a mixture comprising about 70 grams of polyureasilazane made substantially according to the method of Example 2 (and with the addition of about 0.5 percent dicumyl peroxide by weight of the polyureasilazane), and about 30 grams of silicon hexaboride (~66 μm, Cerac/Pure Advanced Specialty Inorganics, Milwaukee, Wis.). The coated disc was heated at about 150° C. for about 30 minutes in an air atmosphere to cure the polyureasilazane. After curing, the coated substrate weighed about 22.52 grams. The coated substrate was then heated in an air atmosphere from room temperature to about 450° C. in about 2 hours and held at about 450° C. for about 3 hours. The coated substrate obtained was brown in color and weighed 22.74 grams, thus exhibiting a total weight gain of the coating of about 43 percent. The sample was then immersed in water to soak for about 16 hours at ambient temperature, after which time the water remained clear and colorless with no noticeable particulates present. The disc was removed from the water, dried by paper towel and then further dried by heating at about 150° C. for about 2 hours. The disc was then reweighed. The dried, coated disc weighed about 22.72 grams.

The coated disc was then placed in a stainless steel holder which allowed over 99 percent of the disc surface to be directly exposed to hot ambient, convecting air. The holder and the specimen were placed in a box furnace which had been heated to about 650° C. Approximately every 3 to 4 hours the holder and specimen were removed from the furnace and quenched in ambient air, the specimen was weighed and remounted in the holder, and then the holder and specimen were replaced in the heated furnace for additional heating in air. After 4 hours the oxidation weight loss was about 1.7 percent. This compares to the oxidation weight loss of about 27 percent for an uncoated graphite disc. After about 24 hours the oxidation weight loss was only about 44 percent, which compares to the oxidation weight loss of about 100 percent for the uncoated graphite disc. This example demonstrates the surprising hydrolytic and oxidative stability which is imparted to a graphite substrate when coated and subsequently heated in an oxidizing atmosphere.

EXAMPLE 19

The present example demonstrates, among other things, the formation of a coating composition from a mixture of polyureasilazane, zirconium oxide and boron carbide coated onto an aluminum oxide substrate. Example 10 was substantially repeated except that the mixture was prepared by combining about 50 grams of polyureasilazane prepared substantially according to the method of Example 2, 10 grams of zirconium oxide (0.5 μm, SC-15 grade, Magnesium Elektron, Inc., Flemington, N.J.), and 10 grams of boron carbide (B$_4$C, 5 μm, ESK-Engineered Ceramics, New Canaan, Conn.), and then brush coated onto an aluminum oxide substrate. The coated substrate was heated for about 1 hour to about 200° C. in air, and then heated to about 500° C. for about 12 hours in air. The coated substrate demonstrated hydrolytic stability.

EXAMPLE 20

The present example demonstrates, among other things, the formation of a coating composition from a mixture of polytetrafluoroethylene, polyureasilazane, silicon carbide, boron carbide and stainless steel flakes. The coating was prepared by combining about 50 grams of component A and about 50 grams of component B. Component A was comprised of about 100 grams of polyureasilazane prepared substantially according to the method of Example 2, 35 grams of silicon carbide (E-110, 5 μm, Norton, Liliesand, Norway), 30 grams of boron carbide (B$_4$C, 5 μm, ESK-Engineered Ceramics, New Canaan, Conn.), and 30 grams of stainless steel flakes (15–40 μm, 316×SS leafing grade, U.S. Bronze Powders, Inc., Flemington, N.J.). Component B was comprised of about 130 grams of polyureasilazane prepared substantially according to the method of Example 2 and 50 grams of polytetrafluoroethylene (sold under the trademark Teflon® 7A, DuPont, Wilmington, Del.). The mixture was airbrushed onto a silicon carbide reinforced aluminum oxide composite body made substantially in accordance with the teaching of U.S. Pat. No. 4,923,832, the subject matter of which is specifically incorporated herein by reference. After heating, the resulting coated body demonstrated good adherence cohesion and scratch resistance.

EXAMPLE 21

The present example demonstrates, among other things, the formation of a coating composition from a mixture of polysilazane, zirconium oxide, and boron carbide. The coating was prepared substantially according to Example 10, except that the composition comprised about 100 grams of polysilazane prepared substantially according to the method of Example 2, about 30 grams of zirconium oxide (0.5 μm, SC-15 grade, Magnesium Elektron, Inc., Flemington, N.J.), and about 15 grams of boron carbide (B$_4$C, 5 μm, ESK-Engineered Ceramics, New Canaan, Conn.). The coating was heated to about 850° C. for about 24 hours on a stainless steel substrate, and the resulting coated substrate demonstrated good adhesion and cohesion.

EXAMPLE 22

The present example demonstrates, among other things, the formation of a coating composition comprised of multiple layers of differing compositions. The coating was prepared substantially according to the method of Example 10, except that the composition of the first layer comprised about 100 grams of polyureasilazane prepared substantially according the method of Example 2, about 33 grams of stainless steel flake (15–40 μm, 316×SS leafing grade, U.S. Bronze Powders, Inc., Flemington, N.J.), and about 15 grams of boron carbide (B$_4$C, 5 μm, ESK-Engineered Ceramics, New Canaan, Conn.). The second layer comprised about 25 grams of polyureasilazane prepared substantially according to the method of Example 2, about 60 grams of zirconium oxide (0.5 μm, SC-15 Grade, Magnesium Elektron, Inc., Flemington, N.J.), and about 15 grams of boron carbide (B$_4$C, 5 μm, ESK-Engineered Ceramics, New Canaan, Conn.). The coatings were sprayed onto a mild steel substrate without heating between applications. The coated substrate subsequently was heated to about 210° C. for about 1 hour, and then heated to about 850° C. The coating composition was observed to protect the substrate against heating at about 850° C. for more than about 12 hours.

EXAMPLE 23

The present example demonstrates, among other things, the formation of a coating composition comprising multiple layers of differing compositions on a substrate comprising carbon fiber reinforced AVIMID™ polymer composite (DuPont, Wilmington, Del.). The coating was prepared substantially according to the method of Example 10, except that the composition of the first layer comprised about 30 grams of polyureasilazane prepared substantially according to the method of Example 2, about 50 grams of zirconium oxide (0.5 μm, SC-15 grade, Magnesium Elektron, Inc., Flemington, N.J.), and about 20 grams of boron carbide (B$_4$C, 5 μm, ESK-Engineered Ceramics, New Canaan, Conn.). The second layer comprised about 100 grams of polyureasilazane prepared substantially according to the method of Example 2, about 40 grams of zinc, and about 15 grams of boron carbide (B$_4$C, 5 μm, ESK-Engineered Ceramics, New Canaan, Conn.). The coating mixtures were applied with an airbrush, and the coated substrate was heated to about 350° C. at about 100° C. per hour, and held at about 350° C. for about 15 minutes. The resulting coating demonstrated good abrasion resistance.

EXAMPLE 24

The present example demonstrates, among other things, the formation of a coating composition comprised of polyureasilazane, strontium boride and stainless steel flake. The coating was prepared substantially according to the method of Example 3, except that the composition comprised about 90 grams of polyureasilazane prepared substantially according to the method of Example 2, about 15 grams of strontium hexaboride (40 μm, Alfa Products, Danvers, Mass.), and about 33 grams of stainless steel flakes (15–40 μm, 316×SS leafing grade, U.S. Bronze Powders, Inc., Flemington, N.J.). The coating mixture was applied with an airbrush, and the coated substrate was heated to about 200° C. for about 1 hour, and then heated to about 850° C. at a rate of about 500° C. per hour, and held at 850° C. for about 4 hours. The resulting coating demonstrated good adhesion.

EXAMPLE 25

The present example demonstrates, among other things, the formation of a coating composition from a mixture comprising polyureasilazane, zirconium oxide and boron carbide. Example 10 was essentially repeated except that the coating mixture comprised about 100 grams of polyureasilazane prepared substantially according to the method of Example 2, about 49 grams of zirconium oxide (0.5 μm, SC-15 grade, Magnesium Elektron, Inc., Flemington, N.J.), and about 21 grams of boron carbide (B$_4$C, 5 μm, ESK-Engineered Ceramics, New Canaan, Conn.). The coating was brush coated onto a 316 stainless steel substrate, and the coated substrate was heated to about 250° C. at a rate of about 100° C. per hour, and held at about 250° C. for about 4 hours. The resulting coating, which measured about 35 μm thick, was tested under the conditions set forth in ASTM standard D968-81, and demonstrated an abrasion resistance factor of about 32,000.

EXAMPLE 26

The present example demonstrates, among other things, the formation of a coating composition from a mixture comprising polyureasilazane, zirconium oxide and boron carbide. Example 25 was essentially repeated except that the coating mixture comprised about 100 grams of polyureasilazane prepared substantially according to the method of Example 2, about 49 grams of zirconium oxide (0.5 μm, Magnesium Elektron, Inc., Flemington, N.J.), and about 21 grams of boron carbide ($B_4C$, 5 μm, ESK-Engineered Ceramics, New Canaan, Conn.). The coating was brush coated onto a 316 stainless steel substrate, and the coated substrate was heated to about 500° C. at a rate of about 100° C. per hour, and held at about 500° C. for about 4 hours. The resulting substrate was tested under the conditions set forth in ASTM standard D968-81, and demonstrated an abrasion resistance factor of about 11,538.

EXAMPLE 27

The present example demonstrates, among other things, the formation of a coating composition from a mixture comprising polyureasilazane, zirconium oxide and boron carbide. Example 25 was essentially repeated except that the coating mixture comprised about 100 grams of polyureasilazane prepared substantially according to the method of Example 2, about 21 grams of zirconium oxide (0.5 μm, Magnesium Elektron, Inc., Flemington, N.J.), and about 49 grams of boron carbide ($B_4C$, 5 μm, ESK-Engineered Ceramics, New Canaan, Conn.). The coating was brush coated onto a 316 stainless steel substrate, and the coated substrate was heated to about 500° C. at a rate of about 100° C. per hour, and held at about 500° C. for about 4 hours. The resulting substrate was tested under the conditions set forth in ASTM standard D968-81, and demonstrated an abrasion resistance factor of about 11,428.

EXAMPLE 28

The present example demonstrates, among other things, the formation of a coating composition from a mixture comprising a polyureasilazane, zirconium oxide and boron carbide on both a stainless steel and a carbon steel substrate. Example 3 was substantially repeated except that the coating mixture comprised about 25 percent by weight of polyureasilazane prepared substantially by the method of Example 2, about 60 percent by weight zirconium oxide (0.5 μm, SC-15 grade, Magnesium Elektron, Inc., Flemington, N.J.), and about 15 percent by weight boron carbide ($B_4C$, 5 μm, ESK-Engineered Ceramics, New Canaan, Conn.). The substrates, measuring about 30 cm by about 3.8 cm by about 0.4 cm, were brush coated with the mixtures, and heated to about 800° C. at a rate of about 200° C. per hour, and held at about 800° C. for about 2 hours. The coated substrates were submerged in a composite melt comprising silicon, aluminum and magnesium having about 30 percent by volume silicon carbide particulate therein, which was stirred at a rate adequate to distribute the silicon carbide particles substantially homogeneously within the melt, at a temperature of about 750° C. for about 6 hours. The coated substrates were removed from the melt and allowed to cool. The solidified composite was easily removed from the coated substrates, and the substrates remained unabraded, without cracks or spalling.

COMPARATIVE EXAMPLES

The following Examples are directed to compositions which, for reasons not fully understood, did not form desirable coatings which were resistant to certain adverse environments.

Example A

Example 3 was substantially repeated except that the coating mixture comprised about 50 grams of polyureasilazane prepared substantially according to Example 2, about 10 grams of nickel boride (~66 μm, Alfa Product, Ventron Division, Danvers, Mass.), and about 10 grams of silicon carbide (E-110, 5 μm, Norton, Liliesand, Norway). The coated substrate was heated to about 200° C. for about 1 hour in air, and then heated to about 500° C. for about 12 hours in air. The resulting coating was cooled to room temperature and was observed to degrade upon immersion in water.

Example B

An uncoated graphite disc measuring about 5 cm in diameter by about 0.6 cm in height and weighing about 23.02 grams was coated with a mixture substantially identical to the mixture prepared in Example 9. The disc was then heated at about 150° C. for about 2 hours in a nitrogen atmosphere, essentially according to Example 9. The coated disc was then weighed and determined to have a weight of about 23.53 grams. The disc was then heated in a nitrogen atmosphere from room temperature to about 850° C. over a period of about 2 hours, held at about 850° C. for about 15 minutes and then cooled to room temperature. The coating obtained was black in appearance, and the coated disc weighed about 23.30 grams, thus exhibiting a coating weight loss of about 59 percent. The sample was then soaked in water at ambient temperature for about 16 hours and dried essentially according to the method described in Example 9. After the disc was immersed in the water, the water appeared cloudy with a pronounced deposit of particulates, and the disc weighed only 23.04 grams, thus indicating a weight loss of about 0.27 grams of mass during water immersion. Upon removal, the disc had substantially the same appearance as the uncoated graphite disc originally used to prepare the sample, and the weight of the disc was nearly identical to the weight of the uncoated disc (23.02 grams).

Example C

The following example demonstrates a coating prepared with boron oxide. Example A was substantially repeated, except that the coating mixture comprised about 70 grams of polyureasilazane prepared substantially according to the method of Example 2, about 10 grams of boron oxide ($B_2O_3$, crushed, A76-3, Fischer Scientific, Fairlawn, N.J.), and about 20 grams of zirconium oxide (0.5 μm, SC-15 grade, Magnesium Elektron, Inc., Flemington, N.J.). The coated substrate was heated to about 500° C. for about 1 hour, and then heated to about 800° C. for about 30 minutes. The coating was cooled to room temperature and was observed to degrade when immersed in water at ambient temperature.

Example D

The following example demonstrates a coating prepared with colloidal silica. Example A was substantially repeated, except that the coating mixture comprised about 50 grams of colloidal silicon dioxide (NYACOL® 2040, Nyacol Products, Inc., an affiliate of PQ Corp, Ashland, Mass.), about 10 grams of boron carbide ($B_4C$, 5 μm, ESK-Engineered Ceramics, New Canaan, Conn.), and about 10 grams of silicon carbide (E-110, 5 μm, Norton, Liliesand, Norway). The coated substrate was heated to about 500° C. for about 1 hour, and then heated to about 800° C. for about 30 minutes. The coating was cooled to room temperature and was observed to degrade when immersed in water at ambient temperature.

Example E

The following example demonstrates a coating prepared with polybutylmethacrylate. Example A was substantially repeated except that the coating mixture comprised about 50 grams of ELVACITE® (DuPont Elvacite, 2045, DuPont, Wilmington, Del.) in xylene, about 10 grams of boron carbide ($B_4C$, 5 μm, ESK-Engineered Ceramics, New Canaan, Conn.), and about 10 grams of silicon carbide (E-110, 5 μm, Norton, Liliesand, Norway). The coated substrate was heated to about 500° C. for about 1 hour, and then heated to about 800° C. for about 30 minutes. The coating brushed off as a powder.

Example F

The following example demonstrates a coating prepared with polycarbosilane. Example A was substantially repeated, except that the coating mixture comprised about 7.5 grams of NICALON® (polycarbosilane, Nippon Carbon Co., Ltd., Dow Corning Corp. (distributor), Midland, Mich.), about 20 ml xylene, about 2.5 grams of boron carbide ($B_4C$, 5 μm, ESK-Engineered Ceramics, New Canaan, Conn.), and 2.5 grams of silicon carbide (E-110, 5 μm, Norton, Liliesand, Norway). The coated substrate was heated to about 500° C. for about 1 hour. The coating was cooled to room temperature and was observed to degrade when immersed in water at ambient temperature.

Example G

The following example demonstrates a coating prepared with dimethylsiloxane. Example A was substantially repeated except that the coating mixture comprised about 7.5 grams of dimethylsiloxane (Aldrich 14615-3, Milwaukee, Wis.), about 2.5 grams of boron carbide ($B_4C$, 5 μm, ESK-Engineered Ceramics, New Canaan. Conn.), and about 2.5 grams of silicon carbide (E-110, 5 μm, Norton, Liliesand, Norway). The coated substrate was heated to about 500° C. for about 1 hour. The coating was cooled to room temperature and was observed to degrade when immersed in water at ambient temperature.

We claim:

1. A method of forming a coating comprising a first layer and at least one subsequent layer on at least one substrate material, comprising the steps of:

1) combining at least one boron source material comprising an extended boron-boron bonding network and at least one polymer comprising at least some silicon-nitrogen bonds to form a first mixture;

2) providing said first mixture onto at least a portion of at least one substrate to form a first layer on said at least one substrate;

3) combining at least one second boron source material comprising an extended boron-boron bonding network and at least one second polymer comprising at least some silicon-nitrogen bonds to form at least one subsequent mixture;

4) providing said at least one subsequent mixture over at least a portion of said first layer to form at least one subsequent layer on said at least one substrate;

5) heating said at least one substrate material having thereon said first layer and said at least one subsequent layer in the presence of at least one oxidant to cause said coating to form.

2. The method of claim 1, wherein said substrate is heated in the presence of at least one oxidant prior to the application of at least one of said at least one subsequent layer.

3. The method of claim 1, wherein said first layer and at least one of said at least one subsequent layers comprise compositions which are substantially different from one another.

4. The method of claim 1, wherein at least one of said first layer and said at least one subsequent layer further comprises at least one filler.

* * * * *